United States Patent [19]

Koiwai et al.

[11] 4,351,356

[45] Sep. 28, 1982

[54] PRESSURE CONTROL VALVE

[75] Inventors: Hideshi Koiwai, Toda; Shizuo Matsumura, Konosu; Haruhiko Kawasaki, Sagamihara, all of Japan

[73] Assignee: Kayaba Kogyo Kabushiki Kaisha, Tokyo, Japan

[21] Appl. No.: 163,130

[22] Filed: Jun. 26, 1980

[30] Foreign Application Priority Data

Jul. 25, 1979 [JP] Japan ............................. 54-94502

[51] Int. Cl.³ ............................................. F16K 17/18
[52] U.S. Cl. ................................... 137/491; 137/493.1
[58] Field of Search ............. 137/491, 489, 493, 493.1

[56] References Cited

U.S. PATENT DOCUMENTS

| | | | |
|---|---|---|---|
| 2,827,075 | 3/1958 | Mercier | 137/491 |
| 2,989,072 | 6/1961 | Banker | 137/491 |
| 3,100,503 | 8/1963 | Tennis | 137/491 |
| 3,164,166 | 1/1965 | Tennis | 137/491 |

Primary Examiner—Alan Cohan
Attorney, Agent, or Firm—David G. Alexander

[57] ABSTRACT

A pilot poppet (44) is unseated when a pressure in a back pressure chamber (39) exceeds a spring (47) preload force to communicate the back pressure chamber (39) with a relief port (33). The pressure in a pressure port (32) is communicated to the back pressure chamber (39) through a radial clearance between a piston poppet (61) which extends through a relief poppet (31) and the relief poppet (31). A spring (62) maintains the piston poppet (61) engaged with the pilot poppet (44). Alternatively, the piston poppet and pilot poppet may be integral (66). The relief poppet (31) is unseated by a pressure difference between the back pressure chamber (39) and the pressure port (32) to communicate the pressure port (32) with the relief port (33) since communication of the back pressure chamber (39) with the relief port (33) causes the pressure in the back pressure chamber (39) to drop. The relief poppet (31) seats when the pressure in the pressure port (32) drops below the pressure in the back pressure chamber (39). The pressure receiving area (AR) of the piston poppet (61) is made as small as possible to reduce the net force on the pilot poppet (44) and thereby the pressure drop in the pressure port (32). The ratio of a pressure receiving area (AP) of the pilot poppet (44) to the pressure receiving area (AR) of the piston poppet (61) is at least 1.1.

6 Claims, 5 Drawing Figures

PRESSURE CONTROL VALVE

BACKGROUND OF THE INVENTION

The present invention relates to a pressure control valve for a hydraulic actuator system or the like.

Pressure relief valves are widely used in the art for limiting hydraulic oil pressure to a predetermined maximum value. There are generally two types. A first type comprises a spring loaded relief poppet which is unseated to connect a pressure line to a return line when the pressure in the pressure line exceeds the predetermined value. A second type is similar to the first type but further comprises a pilot poppet to amplify the pressure variation and control the relief poppet with greatly improved accuracy.

However, a problem has remained unsolved in the design of such valves, the closest known prior art being constituted by U.S. Pat. No. 3,164,166, in that the relief poppet opens too much, causing the pressure to undershoot the predetermined value by a large amount before stabilization and disrupt the hydraulic control system which is regulated by the control valve.

An improvement to the basic valve is disclosed in U.S. patent application Ser. No. 121,609, filed Feb. 14, 1980 which is assigned to the same assignee as this application. The improvement is to provide a ratio $A_P/A_R \geq 1.1$, where $A_R$ is an area of the piston poppet exposed to pressure in the pressure port and $A_P$ is an area of the pilot poppet exposed to pressure in the back pressure chamber. The present invention provides an improved arrangement which yet further improves the pressure control.

SUMMARY OF THE INVENTION

A pressure control valve embodying the present invention includes a housing defining a pressure port, a relief port and a back pressure chamber, a relief poppet biased to block communication between the pressure port and the relief port, a first end of the relief poppet communicating with the pressure port and a second end of the relief poppet communicating with the back pressure chamber, a piston poppet slidably extending through the relief poppet, a radial clearance being provided between the piston poppet and the relief poppet which enables restricted communication between the pressure port and the back pressure chamber therethrough, and a pilot poppet biased to block communication between the back pressure chamber and the relief port, the pilot poppet being moved when a pressure in the back pressure chamber is above a biasing force to unblock communication between the back pressure chamber and the relief port, the relief poppet being moved by said pressure difference to unblock communication between the pressure port and the relief port, adjacent ends of the pilot poppet and the piston poppet being maintained in constant engagement with each other.

In accordance with the present invention, a pilot poppet is unseated when a pressure in a back pressure chamber exceeds a spring preload force to communicate the back pressure chamber with a relief port. The pressure in a pressure port is communicated to the back pressure chamber through a radial clearance between a piston poppet which extends through a relief poppet and the relief poppet. A spring maintains the piston poppet engaged with the pilot poppet. Alternatively, the piston poppet and pilot poppet may be integral. The relief poppet is unseated by a pressure difference between the back pressure chamber and the pressure port to communicate the pressure port with the relief port since communication of the back pressure chamber with the relief port causes the pressure in the back pressure chamber to drop. The relief poppet seats when the pressure in the pressure port drops below the pressure in the back pressure chamber. The pressure receiving area (AR) of the piston poppet is made as small as possible to reduce the net force on the pilot poppet and thereby the pressure drop in the pressure port. The ratio of a pressure receiving area (AP) of the pilot poppet to the pressure receiving area (AR) of the piston poppet is at least 1.1.

It is an object of the present invention to provide an improved control valve which overcomes the drawbacks of the prior art and eliminates undershooting of a desired control pressure.

It is another object of the present invention to provide a control valve which performs more accurate control than has been possible in the prior art.

It is another object of the present invention to provide a control valve which enables stabilization to a desired pressure in a reduced period of time compared to the prior art.

It is another object of the present invention to provide a generally improved pressure control valve.

Other objects, together with the foregoing, are attained in the embodiment described in the following description and illustrated in the accompanying drawing.

DESCRIPTION OF THE PREFERRED EMBODIMENT

While the pressure control valve of the present invention is susceptible of numerous physical embodiments, depending upon the environment and requirements of use, substantial numbers of the herein shown and described embodiment have been made, tested and used, and all have performed in an eminently satisfactory manner.

Figure 1:
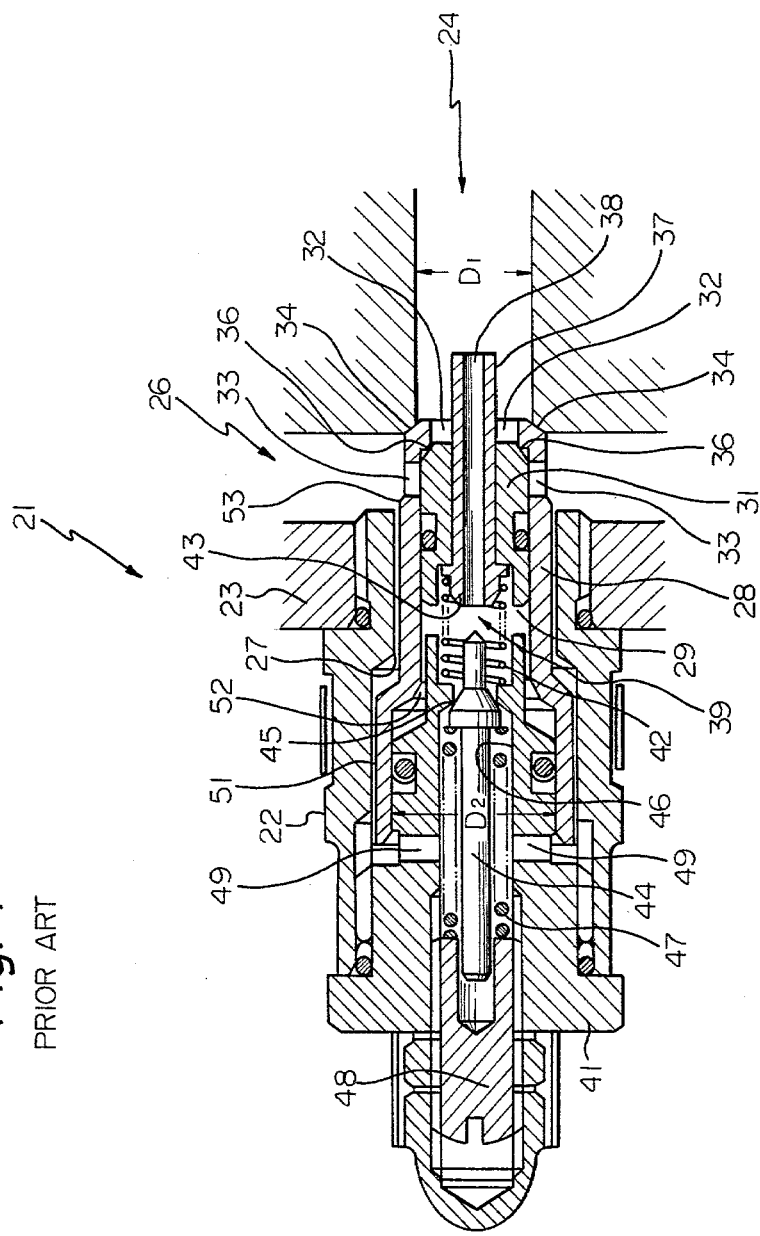
FIG. 1 is a sectional view of a prior art pressure control valve.
Figure 2:
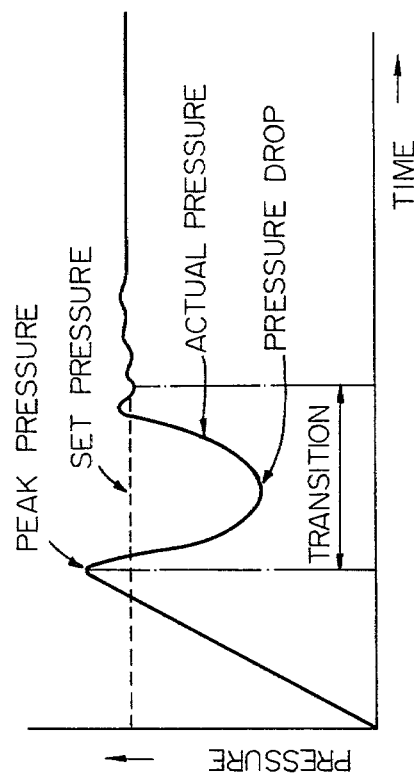
FIG. 2 is a graph illustrating the operation of the prior art pressure control valve.

Referring now to FIGS. 1 and 2 of the drawing, a prior art pressure control valve is generally designated by the reference numeral 21 and comprises a housing 22. The housing 22 is screwed into a threaded hole formed in a block 23. The block 23 may be part of a hydraulic control system such as for a construction vehicle (not shown) and is provided with a pressure passageway 24 leading to a high pressure source and a relief passageway 26 leading to reservoir, although these elements are not shown. The purpose of the valve 21 is to maintain the fluid pressure in the passageway 24 below a predetermined value. Where the source is adapted to constantly supply fluid at a pressure above the predetermined value, the purpose of the valve 21 is to maintain the pressure at the predetermined value by connecting the pressure passageway 24 to the relief passageway 26 when the pressure exceeds the predetermined value and thereby bypass flued from the passageway 24 to the passageway 26 and reduce the pressure in the passageway 24.

The housing 22 is formed with a bore 27 in which a check poppet 28 is slidably movable. The check poppet 28 is also formed with a bore 29 in which a relief poppet 31 is slidably movable. The right end of the check poppet 28 is open to the pressure in the passageway 24 and constitutes a pressure port 32. Radial holes 33 are formed in the check poppet 28 which communicate with the the passageway 26 and constitute relief ports. Normally, the check poppet 28 seats on the block 23 as indicated at 34 in a sealing manner. The relief poppet 31 is also biased to seat on the check poppet 28 as indicated at 36 to block communication between the ports 32 and 33. Thus, communication between the passageways 24 and 26 is also blocked.

A tubular piston poppet 37 slidably extends through a hole formed in the relief poppet 31, the piston poppet 37 defining a bore 38. The piston poppet 37 communicates the pressure port 24 with a back pressure chamber 39 constituted by part of the bore 29. A valve body 41 is screwed into the housing 22. A compression spring 42 is seated on the right end portion of the valve body 41 and urges the piston poppet 37 rightwardly so that a seat portion 43 thereof abuts against the relief poppet 31.

A pilot poppet 44 is slidably disposed in a bore 46 in the body 41 and urged to seat against a seat portion 45 of the body 41 by a compression spring 47. Unseating of the poppet 44 enables the back pressure chamber 39 to communicate with the bore 46. A set screw 48 is provided for manual adjustment of the preload of the spring 47. The bore 46 communicates with the relief passageway 26 through radial passageways 49 and a clearance 51 between the housing 22 and the check poppet 28.

When the pressure in the passageway 24 is below the predetermined maximum value, the pressure in the back pressure chamber 39 is the same as the pressure in the passageway 24 due to communication through the bore 38 of the piston poppet 37. The relief poppet 31 and check poppet 28 are biased to their rightmost seating positions due to the configuration of the relief poppet 31. More specifically, the pressure receiving area of the left end of the poppet 31 is greater than the pressure receiving area of the right end thereof, thereby creating a pressure difference which urges the poppets 28 and 31 rightwardly. The pilot poppet 44 is seated due to the preload force of the spring 47 which overcomes the pressure in the back pressure chamber.

When the pressure in the passageway 24 and chamber 39 exceeds the predetermined value, the pilot poppet 44 is unseated to communicate the back pressure chamber 39 with the relief passageway 26 through the bore 46, passageways 49 and clearance 51. This causes the pressure in the chamber 39 to drop and create a pressure difference acting on the piston poppet 37 which causes the piston poppet 37 to move leftwardly and seat on the pilot poppet 44. This blocks the bore 38 and thereby blocks communication between the pressure passageway 24 and the back pressure chamber 39. This causes the pressure in the chamber 39 to decrease at a much higher rate.

As a result of the decreasing pressure in the chamber 39, the pilot poppet 44 will seat when the pressure in the chamber 39 drops to a level so as to balance the biasing force of the spring 47 and, as will become clear from further description, the piston poppet 37. This has the effect of trapping fluid at a relatively low pressure in the back pressure chamber 39.

Meanwhile, the pressure in the passageway 24 is still high, and the pressure difference between the passageway 24 and chamber 39 causes the relief poppet 31 to move leftwardly off the seat 36 and communicate the passageway 24 with the passageway 26 through the ports 32 and 33. This causes the pressure in the passageway 24 to drop due to fluid flow into the relief passageway 26. When the pressure in the passageway 24 drops slightly below the pressure in the chamber 39, there is a net force on the piston poppet 37 causing the same to unseat from the pilot poppet 44 and move rightwardly. This communicates the back pressure chamber 39 with the pressure passageway 24 causing an increase in pressure in the back pressure chamber 39. This causes the relief poppet 31 to move rightwardly and seat on the seat 36, thereby blocking communication between the passageways 24 and 26. The original conditions described above prevail after the conclusion of the pressure relief action.

The check poppet 28 is designed to communicate the passageways 24 and 26 when the pressure in the passageway 24 drops below a second predetermined value which is lower than the pressure relief value. The second predetermined value may be such that the pressure in the passageway 24 drops below the pressure in the passageway 26. This can occur due to cavitation or other void formation conditions in the passageway 24.

The check poppet 28 is normally held engaged with the seat 34 since a diameter D2 at a left end portion thereof which is exposed to pressure in the chamber 39 through a clearance 52 is larger than a diameter D1 exposed to pressure in the passageway 24. However, the check poppet 28 is formed with a shoulder 53 exposed to pressure in the relief passageway 26 which is at a relatively low supply pressure. When the pressure in the passageway 24 drops below the pressure in the passageway 26, the pressure acting leftwardly on the shoulder 53 urges the check poppet 28 off the seat 34 to allow fluid from the passageway 26 to flow into the passageway 24.

FIG. 2 illustrates a problem which has existed heretofore in the prior art. As shown, the pressure in the passageway 24 initially exceeds the set pressure which is the predetermined maximum relief pressure and corresponds to the preload of the spring 47. However, during a transition period the pressure drops well below the set pressure before stabilizing. This is due to the fact that the piston poppet 37 exerts a leftward force on the pilot poppet 44 when the piston poppet 37 engages the pilot poppet 44 to block the bore 38. In the prior art, an area AP of the pilot poppet 44 which is exposed to pressure in the back pressure chamber 39 is equal to an area AR of the piston poppet 37 which is exposed to pressure in the passageway 24 and also to reverse pressure in chamber 39. The net force on the piston poppet 37 is in the leftward direction, opposite to the force of the spring 47. This has the effect of reducing the biasing force on the pilot poppet 44, causing it to seat at a pressure in the chamber 39 which is substantially lower than the set pressure. This is what causes the pressure undershoot in the transition region illustrated in FIG. 2. The larger the area AR, the greater the undershoot since the net force on the piston poppet 37 is greater. It is desirable to make the area AR as small as possible. Experiments have indicated that improved performance will be obtained when the valve 21 is designed such that $A_P/A_R \geq 1.1$.

In the present type of pressure control valve 21, large fluctuation is observed in the set pressure immediately after opening of the relief poppet 31 as shown in FIG. 2, and the pressure waveform drops drastically after the peak pressure. According to experiments, this pressure drop is not constant but exhibits great fluctuation and tends to be extremely unstable.

According to investigation, the cause may be ascribed to the following fact. Since the pressure change (drop) is too rapid in the back pressure chamber 39 immediately after the piston poppet 37 is moved and seated on the pilot poppet 44, the relief poppet 31 opens too much.

In order to restrict the pressure drop in the back pressure chamber 39, the ratio of the sectional area $A_R$ of the piston poppet 37 to the area $A_P$ of the pilot poppet 44 is made to satisfy the relation $$A_P/A_R \geq 1.1.$$

By use of the above arrangement, the transient characteristics and stability of pressure control immediately after unseating of the relief poppet 31 are improved.

Another problem with the basic design of the valve 21 is a fundamental tendency for pressure overshoot and undershoot due to the time required for movement of the piston poppet 37 and the fact that the piston poppet 37, when it seats on the pilot poppet 44, completely blocks communication between the pressure passageway 24 and the back pressure chamber 39.

During the time required for the piston poppet 37 to move leftwardly into engagement with the pilot poppet 44, the pressure in the pressure passageway 24 has time to rise to a yet greater value than that required to unseat the pilot poppet 44. This causes the relief poppet 31 to be unseated to an excessive extent and causes the pressure in the back pressure chamber 39 to drop excessively below the set pressure. This causes the pressure in the passageway 24 to drop excessively and produce the undershoot.

Figure 3:
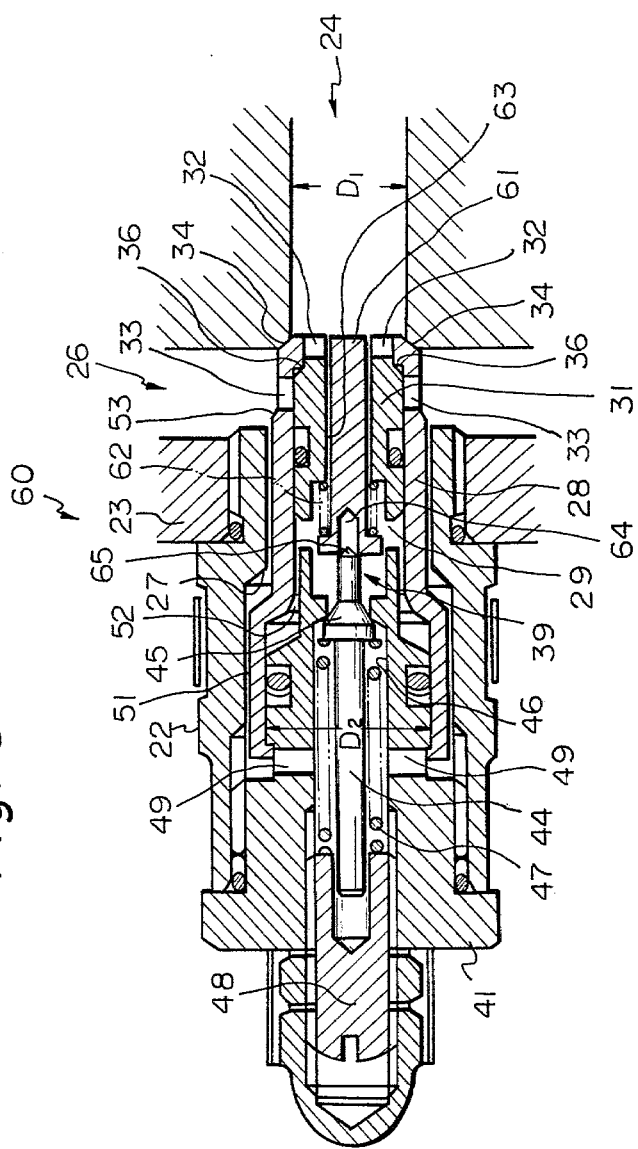
FIG. 3 is similar to FIG. 1 but shows an improved valve embodying the present invention.
Figure 4:
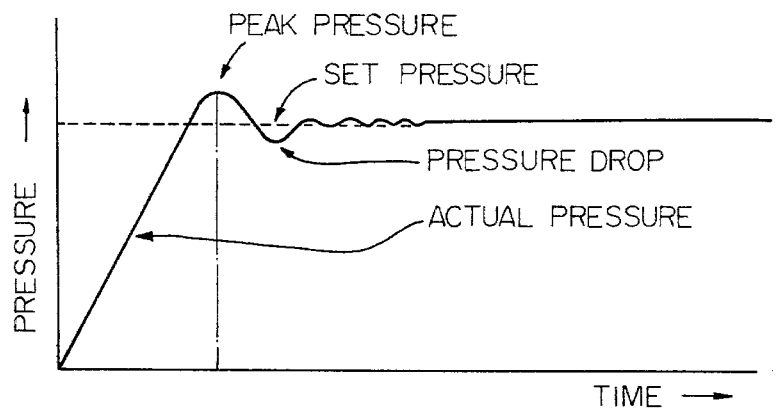
FIG. 4 is a graph illustrating the operation of the present invention.

These drawbacks are overcome in accordance with the present invention as illustrated in FIG. 3. The operation of a pressure control valve 60 embodying the present invention is illustrated in FIG. 4. It will be noted that overshoot and undershoot are reduced to a major extent over the prior art. Like elements are designated by the same reference numerals used in FIG. 1.

In the valve 60, the piston poppet 37 is replaced by a piston poppet 61 which is constantly maintained in engagement with the right end of the pilot poppet 44 by a spring 62. A radial clearance 63 is provided between the outer surface of the piston poppet 61 and the inner surface of the relief poppet 31 which enables the back pressure chamber 39 to constantly communicate with the pressure passageway 24 to restricted extent.

The piston poppet 61 may be formed with a bore as in the prior art or may be solid as illustrated. If the piston poppet 61 is formed with a bore, the bore is constantly blocked by the pilot poppet 44 through constant engagement therewith, and the effect is the same as if the bore is not present. The left end of the piston poppet 61 may be formed with a recess 64, although this is not essential. The recess 64 is coaxial with the piston poppet 61 and engages with a conical coaxial projection 65 formed at the right end of the pilot poppet 44 which is conjugate to the recess 64.

The pressure in the back pressure chamber 39 is initially the same as in the pressure passageway 24 and the pilot poppet 44 is unseated when the pressure exceeds the preload of the spring 47. This occurs when the pressure in the passageway 24 rises above the set value. The pressure in the back pressure chamber 39 drops due to communication with the passageway 26 and causes the relief poppet 31 to unseat. A pressure differential exists between the passageway 24 and chamber 39 due to the fact that the clearance 63 acts as a flow restriction. In accordance with an important feature of the present invention, since the back pressure chamber 39 is constantly blocked from the pressure passageway 24 except for the restricted communication through the clearance 63, the relief poppet 31 opens earlier than in the prior art preventing the pressure in the passageway 24 from exceeding the set pressure by an excessive extent. The relief poppet 31 closes earlier than in the prior art since the overshoot is not produced, thereby preventing an excessive undershoot.

Figure 5:
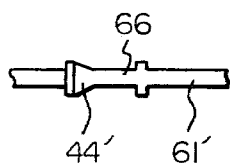
FIG. 5 is a fragmentary view of a modified integral poppet arrangement.

Although the pilot poppet 44 and piston poppet 61 are separate in FIG. 3, they may be integral as indicated at 66 in FIG. 5, with the individual sections constituting the pilot and piston poppets designated as 44' and 61' respectively.

Another advantage of the arrangement of FIG. 3 is that the spring 62 maintains the piston poppet 61 in constant engagement with the pilot poppet 44 and prevents any irregularity in operation due to the angle at which the valve 60 is mounted.

The effectiveness of the valve 60 is yet further increased by making the ratio $A_P/A_R \geq 1.1$ as discussed above.

In summary, it will be seen that the present invention overcomes the drawbacks of the prior art and provides a pressure control valve which has superior ability to accurately regulate pressure. Various modifications will become possible for those skilled in the art after receiving the teachings of the present disclosure without departing from the scope thereof.

What is claimed is:

1. A pressure control valve including:

a housing defining a pressure port, a relief port and a back pressure chamber;

a relief poppet biased to block communication between the pressure port and the relief port, a first end of the relief poppet communicating with the pressure port and a second end of the relief poppet communicating with the back pressure chamber;

a piston poppet slidably extending through the relief poppet, a radial clearance being provided between the piston poppet and the relief poppet enabling restricted communication between the pressure port and the back pressure chamber therethrough;

a pilot poppet biased to block communication between the back pressure chamber and the relief port, the pilot poppet being moved when a pressure in the back pressure chamber is above a biasing force to unblock communication between the back pressure chamber and the relief port, the relief poppet being moved by said pressure difference to unblock communication between the pressure port and the relief port, adjacent ends of the pilot poppet and the piston poppet being maintained in constant engagement with each other;

said adjacent end of the pilot poppet being formed with a coaxial conical projection, said adjacent end of the piston poppet being formed with a coaxial recess conjugate to the conical projection; and biasing means for urging the piston poppet into engagement with the pilot poppet;

the biasing means comprising a spring.

2. A control valve as in claim 1, in which $A_P/A_R \geqq 1.1$ where $A_R$ is an area of the piston poppet exposed to pressure in the pressure port and $A_P$ is an area of the pilot poppet exposed to pressure in the back pressure chamber.

3. A control valve as in claim 1, in which an area of the relief poppet exposed to pressure in the pressure port is smaller than an area of the relief poppet exposed to pressure in the back pressure chamber, thereby biasing the relief poppet to block communication between the pressure port and the relief port.

4. A control valve as in claim 1, further comprising a spring for biasing the pilot poppet to block communication between the back pressure chamber and the relief port.

5. A control valve as in claim 1, further comprising a check poppet for unblocking communication between the pressure port and the relief port when the pressure in the pressure port is below a predetermined value.

6. A control valve as in claim 5, in which the check poppet has a first area exposed to pressure in the pressure port and a second area exposed to pressure in the relief port.

* * * * *